US006095370A

United States Patent [19]

Rhine et al.

[11] Patent Number: 6,095,370

[45] Date of Patent: Aug. 1, 2000

[54] ENCAPSULATED LIQUID DISPENSING DEVICE AND METHOD

[75] Inventors: Stephen P. Rhine, Canton, Mich.; Griffith D. Crammond, Toledo, Ohio; Edward J. Seidl, Lathrup Village, Mich.; Sylvester Holston, III, Cincinnati, Ohio

[73] Assignee: Americlean Systems, Inc., Southfield, Mich.

[21] Appl. No.: 08/993,246

[22] Filed: Dec. 18, 1997

[51] Int. Cl.[7] ..................... G01F 11/00

[52] U.S. Cl. ..................... 222/1; 222/39; 222/66; 222/82; 222/185.1; 222/325; 222/651

[58] Field of Search ..................... 222/1, 39, 64, 222/66, 81, 82, 83, 185.1, 325, 651

[56] References Cited

U.S. PATENT DOCUMENTS

| | | | |
|---|---|---|---|
| 3,828,973 | 8/1974 | Birrell | 222/1 |
| 3,952,918 | 4/1976 | Poitras et al. | 222/82 |
| 4,186,849 | 2/1980 | Spangler | 222/25 |
| 4,529,106 | 7/1985 | Broadfoot et al. | 222/207 |
| 5,086,950 | 2/1992 | Crossdale et al. | 222/88 |
| 5,104,003 | 4/1992 | Stecoza | 222/185.1 |
| 5,156,298 | 10/1992 | LaRue | 222/66 |
| 5,415,324 | 5/1995 | Coventry | 222/63 |
| 5,435,462 | 7/1995 | Fujii | 222/82 |
| 5,445,289 | 8/1995 | Owens | 222/105 |
| 5,490,614 | 2/1996 | Sardynski | 222/66 |

FOREIGN PATENT DOCUMENTS

| | | | |
|---|---|---|---|
| 8300932 | 3/1983 | WIPO | 222/185.1 |

*Primary Examiner*—Joseph A. Kaufman
*Attorney, Agent, or Firm*—Burns, Doane, Swecker & Mathis, L.L.P.

[57] ABSTRACT

A device for dispensing a product solution includes a container for a product solution, the container having a top end, the top end including a continuous septum. The device also includes a receptacle for receiving the container in an inverted condition, the receptacle including a seat portion for receiving the top end of the container, the seat portion including an upwardly extending, hollow piercing device capable of piercing the septum. The device also includes a pump for withdrawing product from the container through the piercing device. A method for dispensing a product solution is also disclosed.

17 Claims, 5 Drawing Sheets

ENCAPSULATED LIQUID DISPENSING DEVICE AND METHOD

BACKGROUND AND SUMMARY OF THE INVENTION

The present invention relates generally to product dispenser systems and more particularly, to a method and device for automatically delivering a concentrated product solution as necessary to maintain a predetermined concentration of the solution at a point of application.

Large amounts of liquid and powdered detergent are used by commercial organizations such as carwashes, laundries, and restaurants. The liquid detergent is normally purchased in large cylindrical shipping containers that typically have a 5, 6, 15, 30, or 55 gallon capacity. Likewise, powdered detergent may be purchased in the same capacities but also in smaller capacities generally weighing between 5 and 15 pounds.

In a commercial establishment such as a restaurant, the detergent is generally used in automatic dishwashers. Each dishwasher has a wash tank that carries a large volume of detergent solution. The dishwasher uses this detergent solution over and over again for a period of time, such as four hours, until it is replaced by a new solution. During normal usage, however, some of the detergent solution is drained off along with food particles and grease removed by the dishwasher to keep the remaining solution as clean as possible. Water is added to the wash tank to maintain a proper level which, of course, reduces the concentration of the solution in the wash tank.

In order to keep the detergent solution in the wash tank at the proper concentration, detergent must be added periodically. The most simple prior art approach to increasing the concentration of detergent was to have an employee periodically add powdered detergent to the dishwasher wash tank. This was not a satisfactory approach. For one thing, it required more or less constant attention by an employee. Further, it was almost impossible for the employee to tell when to add detergent and how much to add. The result was that the detergent concentration in the wash tank fluctuated widely over a period of time.

One prior art approach to improving this situation provides a system that automatically adds concentrated detergent solution to the wash tank when its concentration drops below a specified level. To accomplish this, suitable electrodes are placed in the wash tank to measure solution conductivity. Also a source of concentrated detergent solution is provided. When the conductivity drops below a certain level, a driver device is energized to introduce clean concentrated detergent solution into the wash tank.

Another prior art approach provides a reservoir having an open top covered with a hinged lid. A shipping container, preferably about 10 pounds, having a sufficiently small mesh screen is inverted over the receptacle with the screen and an opening in the reservoir being aligned. A single, upwardly directed water spray nozzle is mounted within the reservoir such that, when the nozzle is energized, the resulting spray wets the entire bottom surface of the screen positioned above the nozzle. A saturated detergent solution results, which falls through the screen into a point of application. An electrical probe is used to turn on the water to the nozzle until the proper solution level is reached in the dishwasher wash tank.

The screen used with these prior art systems is generally a flat or a modified flat conical screen and is used in combination with a single pulsing spray nozzle. These systems are only marginally acceptable for commercial usage because they often result in "channeling" of the detergent in the container, i.e., vertical channels are formed in the powdered detergent above the screen. A desirable system would not form channels but would cause even hydration of the product about one-half inch above the screen. When channeling occurs, a large surface area of the powdered detergent is exposed to the spray and thus becomes hydrated. During periods of non-use, this hydrated detergent dries and can become caked. The caked product is not readily soluble. If the product in the container becomes channeled and caked, it is then difficult to dissolve sufficient detergent to provide the necessary solution concentration in the dishmachine wash tank. Too much powdered detergent is also left in the container and wasted.

Although liquid detergents continue to be utilized in the dishmachine, they are mostly confined to "batch" type dishmachines where the wash tank solution is emptied after each wash cycle. Product is normally purchased in one or five gallon open-ended containers.

Another prior art system is disclosed in U.S. Pat. No. 5,086,950, which is hereby incorporated by reference and which discloses a container capped with a slitted septum cap, and an open-ended, wall-mounted dispensing device in which the top, slitted cap end of the container is received. A penetrating device extends through the slit in the septum, and the sides of the slit close around the penetrating device to prevent material from escaping unless the sides are forced apart. A peristaltic pump is used to displace concentrated products into a pressurized line on a dishmachine. Although spillage and leakage is reduced compared to other prior art systems, this prior art system fails to eliminate spillage and leakage. As a result, high costs are incurred due to leaking containers in storage and shipment. Further. safety can be compromised due to container spillage from faulty septum slits.

An object of the present invention is to provide a dispensing system with substantially no potential for leakage during storage, shipment, and use. It is a further object of the present invention to provide a dispensing system that eliminates the possibility of the use of the wrong container or material in the dispensing system.

The present invention utilizes a self-sealing shipping container of, preferably, homogenous, viscous material. A tamper-evident enclosure cap is preferably attached to the container at the time of production. A wall-mountable receptacle for the product container is provided, having an upwardly facing opening corresponding generally in size to the top of the shipping container. The device is designed to accept product containers for specific applications, draw product out of the containers, verify product availability, and deliver available undiluted product to the end use point when needed, preferably with a peristaltic pump.

The shipping container is positioned over the receptacle, with the enclosure cap in line with an opening of the receptacle. The shipping container has a key or a keyway, and is lowered into the receptacle so that the key is received in a keyway of the receptacle or a key of the receptacle is received in the keyway of the container. The container has a septum that is pierced by a container piercing device, such as a single, cuneiform hollow piercing device which is mounted in the bottom of the receptacle to remove the product from the shipping container when the pump is activated.

The device according to the present invention has proven to be much superior in operation to the prior art systems. The ability of the peristaltic pump to maintain a consistent concentration level in the wash tank has far surpassed other water driven systems of the prior art. The shipping container is entirely enclosed and thereby eliminates the hazards of concentrated products coming into contact with users. Moreover, water consumption at the point of use is reduced, particularly in comparison to devices where caking of product tends to occur.

The ability of the device of the present invention to consistently deliver a homogenous product solution has enabled further development of a "probeless" dispensing system in conjunction with the conventional electrode solution concentration measuring system. Based on timed product feed proportional to water usage rates, the present invention permits maintaining a consistent concentration level in the wash tank in various standard models of dishmachines, including single rack and conveyor-type machines.

In accordance with one aspect of the present invention, a device for dispensing a product solution is provided. The device includes a container for a product solution, the container having a top end, the top end including a continuous septum. The device also includes a receptacle for receiving the container in an inverted condition, the receptacle including a seat portion for receiving the top end of the container, the seat portion including an upwardly extending hollow piercing device capable of piercing the septum. The device also includes a pump for withdrawing product from the container through the piercing device.

In accordance with another aspect of the present invention, a device for dispensing a product solution is provided. The device includes a container for a product solution, the container having a top end, the top end including a first mating device. The device also includes a receptacle for receiving the container in an inverted condition, the receptacle including a seat portion for receiving the top end of the container, the seat portion including a second mating device for mating with the first mating device and a device for extending into the container. The device also includes a pump for withdrawing product from the container through the device for extending into the container.

In accordance with yet another aspect of the present invention, a method for dispensing a product solution is provided. According to the method, a container of product solution is inverted such that a top end of the container faces downwardly, the top end of the container including a continuous septum. The container is positioned in a receptacle such that the top end of the container is disposed in a seat of the receptacle, the seat of the receptacle having a hollow, upwardly extending piercing device. The septum is pierced with the piercing device such that part of the piercing device is disposed inside of the container. The product is withdrawn from the container through the piercing device.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION OF THE PREFERRED EMBODIMENT

Figure 1A:
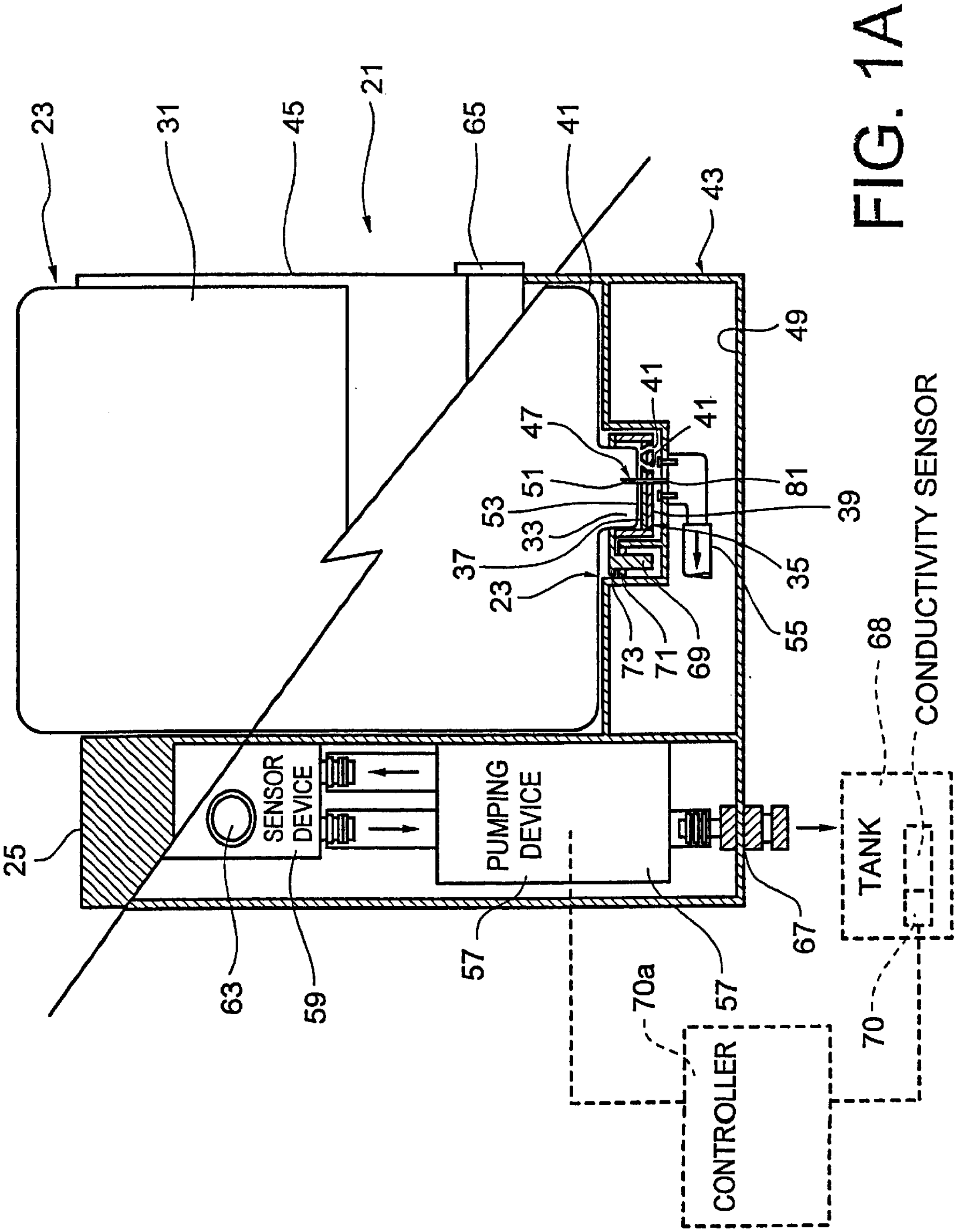
FIGS. 1A and 1B are partially broken, cross-sectional, schematic views of devices for dispensing according to first and second embodiments of the present invention, respectively.
Figure 1B:
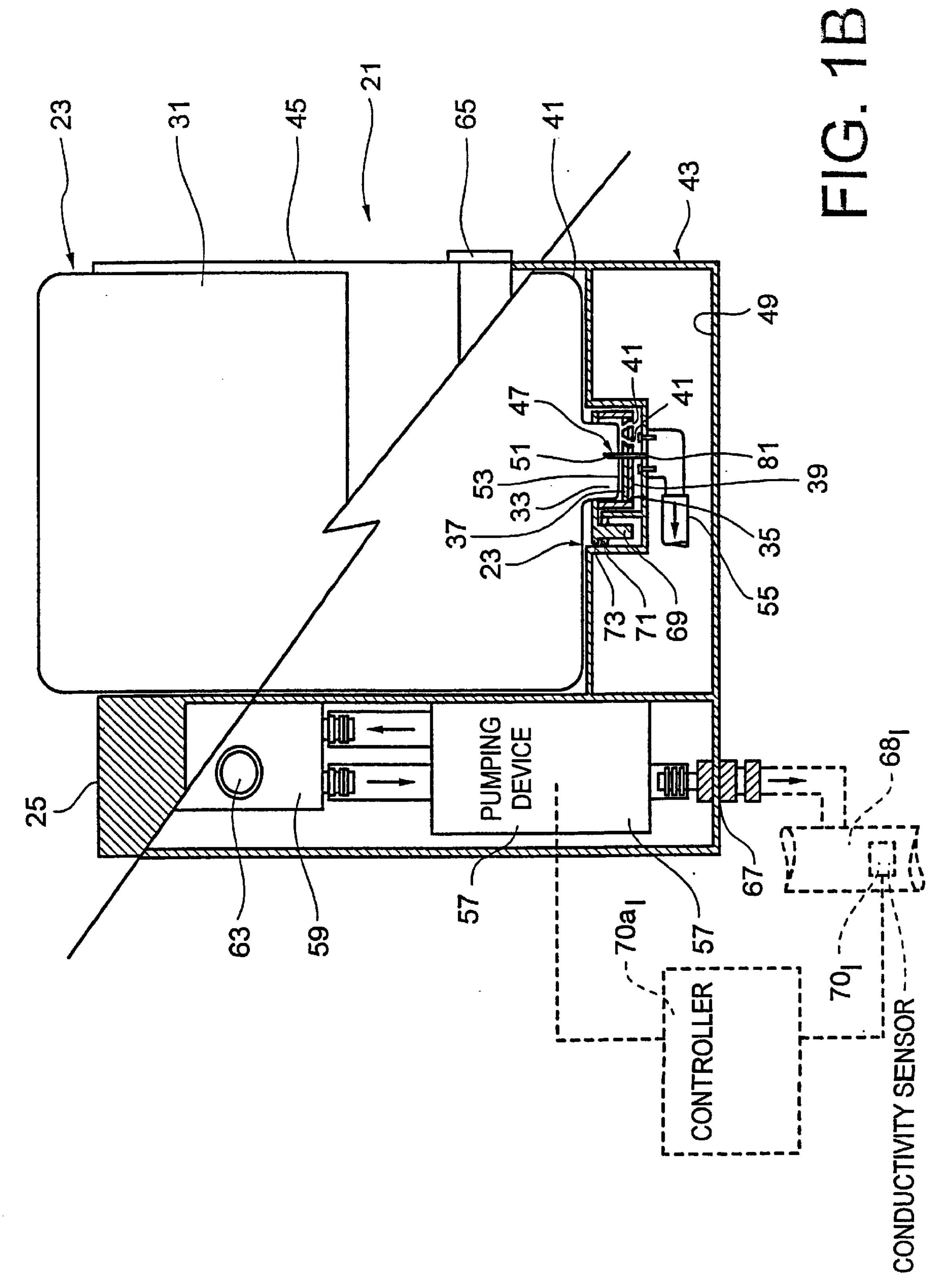

FIG. 1A shows a device 21 according to an embodiment of the present invention. FIG. 1B shows a device 21 according to another embodiment of the present invention that is identical to the device of FIG. 1A, except to the extent discussed below. Except where otherwise noted, the discussion of the device, and associated method, of FIG. 1A that follows shall be considered to be equally applicable to the device, and associated method, of FIG. 1B. The device 21 is preferably in the general form of the device disclosed in U.S. Pat. No. 5,086,980, which is incorporated by reference.

The device 21 includes a container 23 and a separate receptacle 25 in which the container is received in an inverted condition. The container 23 is preferably suitably sized for the application for which it is intended, e.g., smaller when it is intended to be frequently replaced, larger when it is intended to be infrequently changed. The receptacle 25 is preferably mountable upon a vertical wall of a device, or some other suitable surface of a device, such as a dishwashing machine or other device with which the device 21 is intended to be used, or on a shelf, by any suitable attachment devices.

As seen in FIGS. 1A, 1B, and/or 2, the container 23 includes a top end 53 which, when the container is received in the receptacle 25, faces downwardly. The top end 53 is narrower than a remaining portion 31 of the container, with a mouth 33 of the container 23 being provided at the end of the narrow portion. After the container 23 is filled with product, the mouth 33 of the container is preferably sealed by a cap 35.

The cap 35 includes at least a portion in the form of a ductile septum 37 that is continuous, i.e., it has no openings or slits therein, except as otherwise noted herein. The cap 35 is preferably internally threaded and engages with external threads on the mouth 33 of the container 23. The entire cap 35 may be formed of the material forming the ductile septum 37 but, preferably, the cap is separately attached to the ductile septum by means of a locating plate 39 of the cap that stabilizes the septum during attachment of the septum to the cap, with the cap 35 being attached to the locating plate by any suitable technique, such as by an adhesive or by fusing the parts. The septum 37 is preferably provided with a plurality, preferably four, of vent holes 41, preferably in the form of self-sealing mitral valves for permitting air to enter the container 23 when product is removed from the container. The vent holes 41 may, if desired or necessary, be provided in the cap 35 remote from the septum 37.

The receptacle 25 preferably includes a seat 43 for receiving part or all of the mouth 33 of the container 23. A positioning portion 45 is of the receptacle 25 preferably provided for maintaining proper relative alignment of the remaining portion 31 of the container 23 and the receptacle. The positioning portion 45 preferably includes an internal locking bead 46, preferably about ⅝" long, to assist in aligning and stabilizing the container 23 when it is received in the receptacle.

The seat 43 includes a hollow, cuneiform piercing device 47 that projects upwardly from a bottom 49 of the seat. The septum 37 preferably abuts against or is disposed close to the bottom 49 of the seat 43 when the container 23 is received in the receptacle 25 such that a, preferably, pointed or sharpened end 51 of the piercing device 47 pierces the septum and extends past the septum into the container. Another end 81 of the piercing device 47 is connected to a conduit 55 through which product from the container is able to flow. When the piercing device 47 pierces the septum 37, the septum seals around the piercing device, thereby preventing unwanted passage of product out of the container 23. The septum 37 is preferably sufficiently ductile such that, when the piercing device 47 is removed from the septum 37, such as by removing the container 23 from the receptacle 25, the hole formed by the piercing device preferably substantially seals over, thereby preventing residual product from escaping from the container.

As seen in FIG. 1A, the conduit 55 is connected to a pumping device, preferably a peristaltic pump 57, which draws product from the container 23 through the piercing device 47. As product is drawn from the container 23 through the piercing device 47, it preferably passes through a sensor device 59 capable of determining whether product remains in the container in any suitable manner, such as by detecting whether product is being drawn through the conduit 55. One suitable sensor device 59 includes an optical sensor, e.g., a refractor sensor, that detects whether product is present in the conduit 55 by shining a light from a light source on a transparent or semi-transparent conduit. If there are bubbles in the conduit 55, indicating that the container 23 is nearly empty, this fact is sensed when the light is detected by a light detector. Another suitable sensor device 59 is a conductance sensor that uses spaced apart electrodes. When there is no product in the conduit 55 between the electrodes, e.g., if there are bubbles, this fact is sensed because there is nothing to conduct electricity between the electrodes. In a dishwasher apparatus having washing and rinsing portions, an optical sensor is preferred to detect whether rinsing agent is available in the container, and a conductance sensor is preferred to detect whether detergent is available in the container.

If product is not available in the container 23, the sensor device 59 preferably activates an alarm, which preferably includes both a visual alarm 63, e.g., a light or a meter, and an audible alarm 65. The sensor device 59 is preferably disposed after and before a peristaltic pump 57, i.e., the pump acts on flexible portions of the conduit 55 before and after the conduit extends into the sensor device, but may be disposed either before or after the pump as desired or necessary. Product drawn from the container 23 ultimately flows to a point of application through a fitting 67 in the receptacle 25.

The point of application is preferably a device such as a dishwasher or car wash device including a tank 68 for washwater or a rinsing portion of a dishwasher. For one part of a machine with which the device according to the present invention, such as the detergent or washing part of a dishwasher, one embodiment of the tank preferably includes a device such as a conductivity sensor 70, such as electrodes. The conductivity sensor 70 is used in conjunction with a controller 70a for ensuring that a proper solution concentration is maintained in the tank. The conductivity sensor 70 and controller 70*a* are preferably arranged such that a signal is sent to the controller when the conductivity of the water in the tank falls below a desired level indicative of a minimum desired detergent concentration, and the controller thereupon controls the pump 57 to activate the pump for a predetermined time period to cause product to be withdrawn from the container 23. For another device, such as a rinsing portion of a dishwasher, a preferred embodiment, otherwise identical to the embodiment shown in FIG. 1A, uses a pressure sensor 70', such as is seen in FIG. 1B, in a rinse pipe 68', where the pressure sensor senses water pressure in the pipe, indicative of the need to dispense rinse agent, and that sends a signal to a controller 70*a'*, which controls the pump 57 to activate the pump for a predetermined time period to cause product to be withdrawn from the container. If desired or necessary, in a dishwasher using both a wash portion into which detergent is dispensed according to the present invention and a rinse portion into which rinsing agent is dispensed according to the present invention, a single controller may be used instead of two separate controllers. According to still other embodiments of the present invention, product is automatically dispensed by periodic activation of a pump for a specified period of time by a controller based on any suitable factor or factors for a specific application of the invention. For example, the controller may activate the pump to dispense detergent for a predetermined period of time based on a length of time of operation of the washing portion or the rinsing portion of a dishwasher, or it may activate the pump to dispense a rinsing agent for a predetermined period of time based on an amount of flow through a final rinse line.

Figure 5:
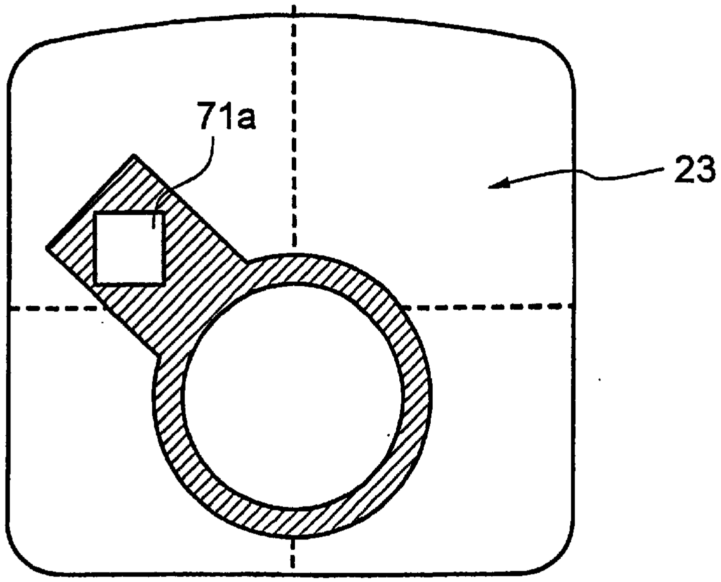
FIG. 5 is a top view of an embodiment of a container according to an embodiment of the present invention.
Figure 4:
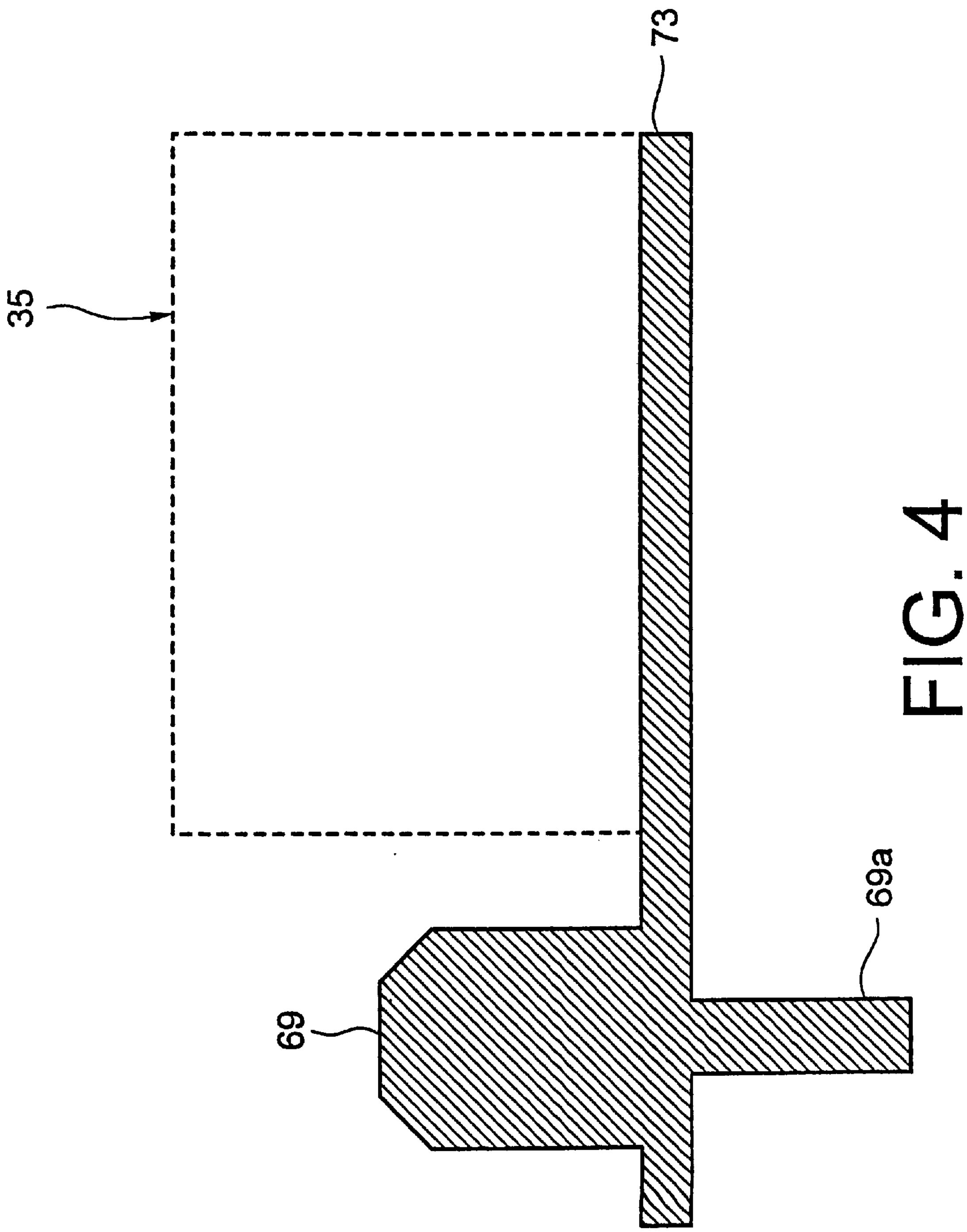
FIG. 4 is a side view of an embodiment of the key device according to an embodiment of the present invention.

As seen in FIGS. 1A, 1B, and/or 2, the container 23 and the receptacle 25 are preferably provided with mating devices such as key 69 and keyway 71 arrangements to ensure that only the proper container can be used on a specific receptacle. For example, the container 23 is preferably provided with a key 69 proximate the mouth 33 of the container. The key 69 is preferably formed separately from the cap 35 and includes a portion 73 that surrounds the mouth of the container, as seen in FIGS. 3A–3D, but may, instead, be formed on a radially projecting part of the cap, as seen by dotted lines in FIG. 4. The key 69 is received in a keyway 71, seen in FIGS. 1A and 1B, formed in the seat 43. If a user attempts to position a container having the wrong key on a receptacle, such as where a receptacle is intended for use with a specific product and the container contains a different product, the container will not seat in the receptacle, thereby minimizing the potential for accidents. The keys and keyways are preferably suitable geometric shapes, such as circles, squares, triangles, rectangles, rhomboids and the like. It will be appreciated that a key can be provided on the seat 43 and a keyway can be provided on the cap 35 in lieu of the key. The top of the key 69 is preferably chamfered to permit easy insertion of the key into the proper keyway 71. The side of the portion 73 opposite the key 69 preferably includes another key 69*a,* seen in FIG. 4, that is received in a keyway 71*a* in the top of the container 23, as seen in FIG. 5, to prevent the portion 73 from rotating relative to the container 23 when the cap 35 is attached to the container by, preferably, being screwed onto the container. If desired or necessary, the key 69*a* and keyway 71*a* can be omitted.

Figure 2:
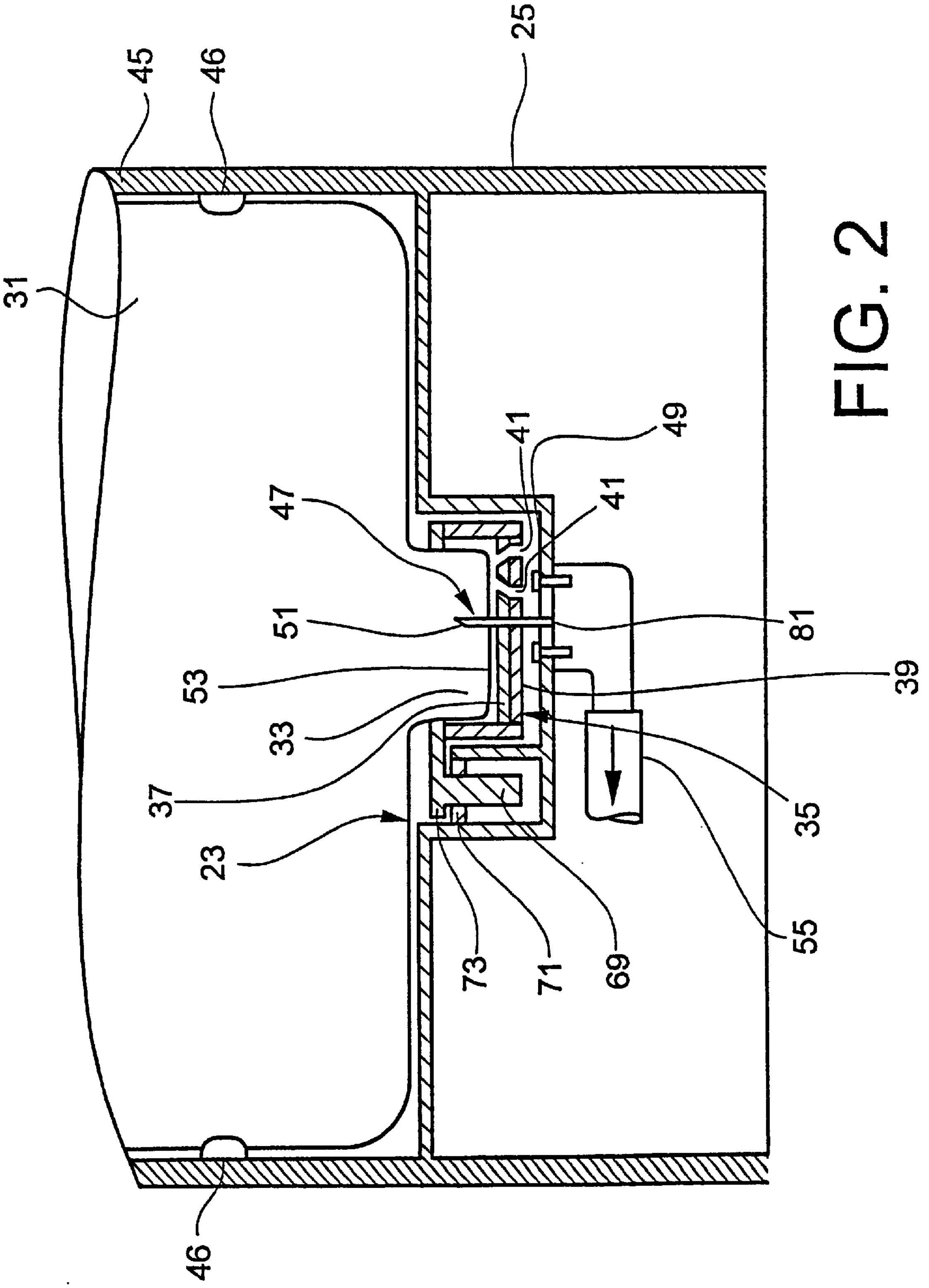
FIG. 2 is a cross-sectional, schematic view of part of a container and a receptacle according to an embodiment of the present invention.
Figure 3A:
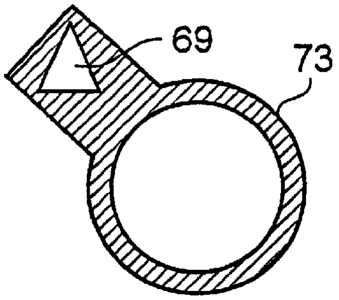
FIGS. 3A–3D are top views of embodiments of key devices according to embodiments of the present invention.
Figure 3B:
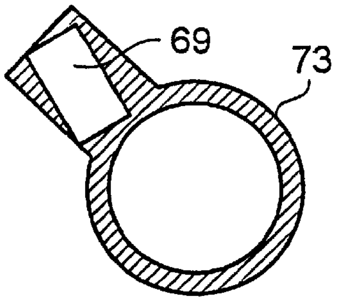
Figure 3C:
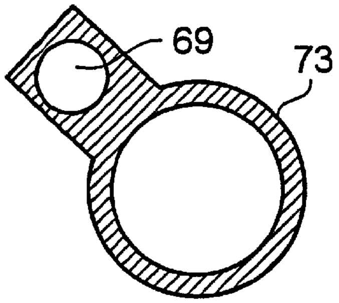
Figure 3D:
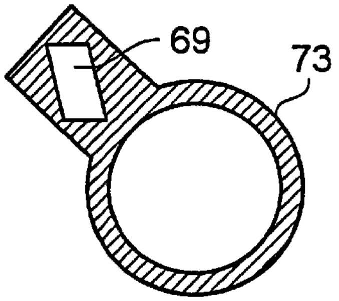

As seen in FIGS. 1A and 2, in an embodiment of the method for dispensing a product solution according to the present invention, the container 23 is inverted such that the top end 53 of the container including the continuous septum 37 faces downwardly. The container 23 is positioned in the receptacle 25 such that the top end 53 of the container is disposed in the seat 43 of the receptacle. The septum 37 is pierced with the piercing device 47 such that part of the piercing device is disposed inside of the container 23. Product is withdrawn from the container 23 through the piercing device 47 by the pump 57. The container 23 includes a first mating device, preferably the key 69, at the top end 53 and the seat 43 includes a second mating device, preferably the keyway 71, for mating with the first mating device. When the container 23 is positioned in the receptacle 25, the key 69 and the keyway 71 are mated unless they are incompatible and prevent seating of the container in the receptacle. The sensor device 59 determines whether product remains in the container 23. An alarm., preferably a visual alarm 63 and an audible alarm 65, is activated when the sensor device determines that the container 23 is substantially empty of product. Air is allowed to enter into the container as product is withdrawn from the container through the vent holes 41, which are preferably in the form of mitral valves.

According to a preferred embodiment, a sensor, such as a conductivity sensor 70 senses conductivity of a solution to monitor a concentration of product in a solution in the tank 68 and provides a signal to a controller 70*a* when it is desired to increase the concentration of the product in the solution, usually when the concentration falls below a specified level. The pump 57 is preferably capable of withdrawing, preferably intermittently, an amount of product from the container 23 and dispensing it, through the conduit 55, into the application solution in the tank such that product is withdrawn from the container and dispensed into the application solution, preferably for a predetermined period of time, in response to a signal from the controller 70*a*. According to another embodiment, a sensor, such as a pressure sensor 70' senses pressure in a solution line and provides a signal to a controller 70*a*' when pressure is sensed, and the controller thereupon sends a signal to the pump 57 to operate for a predetermined period of time. According to still other embodiments, the pump 57 is intermittently operated to dispense product in response to timed events, such as a length of time that a washing portion of a dishwasher is operated or an amount of flow through a rinse line of a rinse portion of a dishwasher.

While this invention has been illustrated and described in accordance with a preferred embodiment, it is recognized that variations and changes may be made therein without departing from the invention as set forth in the claims.

What is claimed is:

1. A device for dispensing a product solution, comprising:

a container for a product solution, the container having a top end, the top end including a septum;

a receptacle for receiving the container in an inverted condition, the receptacle including a seat portion for receiving the top end of the container, the seat portion including an upwardly extending, hollow piercing device capable of piercing the septum;

a pump for withdrawing product from the container through the piercing device, wherein the piercing device is attached to a conduit through which the product flows to a point of application and at least part of the conduit is flexible and the pump is a peristaltic pump disposed along a portion of the conduit.

2. The device as set forth in claim 1, further comprising a sensor for detecting whether product is flowing through the conduit.

3. The device as set forth in claim 2, wherein the sensor is disposed between the piercing device and the pump.

4. The device as set forth in claim 1, wherein the septum is part of a cap that is attachable to and removable from a main body portion of the container.

5. The device as set forth in claim 4, wherein the cap includes internal threads and the main body portion of the container includes corresponding external threads for attaching and removing the cap.

6. The device as set forth in claim 1, wherein the septum includes one or more vents.

7. The device as set forth in claim 6, wherein the one or more vents include mitral valves.

8. A device for dispensing a product solution, comprising:

a container for a product solution, the container having a top end, the top end including a septum;

a receptacle for receiving the container in an inverted condition, the receptacle including a seat portion for receiving the top end of the container, the seat portion including an upwardly extending, hollow piercing device capable of piercing the septum;

a pump for withdrawing product from the container through the piercing device, wherein the septum is part of a cap that is attachable to and removable from a main body portion of the container, and the cap includes key and the seat includes a keyway in which the key is receivable.

9. The device as set forth in claim 8, wherein the piercing device is attached to a conduit through which the product flows to a point of application.

10. A device for dispensing a product solution, comprising:

a container for a product solution, the container having a top end, the top end including a continuous septum;

a receptacle for receiving the container in an inverted condition, the receptacle including a seat portion for receiving the top end of the container, the seat portion including an upwardly extending, hollow piercing device capable of piercing the septum;

a pump for withdrawing product from the container through the piercing device; and a key device attachable to the container, the seat including a keyway in which the key is receivable.

11. A device for dispensing a product solution, comprising:

a container for a product solution, the container having a top end, the top end including a first mating device;

a receptacle for receiving the container in an inverted condition, the receptacle including a seat portion for receiving the fop end of the container, the seat portion including a second mating device for mating with the first mating device and a device for extending into the container; and a pump for withdrawing product from the container through the device for extending into the container, wherein the first mating device is in the form of a key and the second mating device is in the form of a keyway for receiving the key.

12. The device as set forth in claim 11, wherein the key and the keyway are in the form of matching geometric shapes.

13. A method for dispensing a product solution, comprising the steps of:

inverting a container of product solution such that a top end of the container faces downwardly, the top end of the container including a septum, the container further including one of a key and a keyway;

positioning the container in a receptacle such that the top end of the container is disposed in a seat of the receptacle, the seat of the receptacle having a hollow, upwardly extending piercing device and one of a keyway and a key for mating with the one of the key and the keyway of the container, the container being positioned in the receptacle such that the one of the key and the keyway of the container is caused to mate with the one of the keyway and the key of the receptacle;

piercing the septum with the piercing device such that part of the piercing device is disposed inside of the container; and withdrawing the product from the container through the piercing device;

removing the piercing device from the septum; and substantially completely closing an opening in the septum formed by the piercing device, after removal of the piercing device from the septum, by a self-sealing action of the septum.

14. The method as set forth in claim 13, comprising the further step of determining whether product remains in the container.

15. The method as set forth in claim 14, comprising the further step of activating an alarm when it is determined that the container is substantially empty of product.

16. The method as set forth in claim 13, wherein the container includes vents, the method comprising the further step of allowing entry of air into the container as product is withdrawn from the container.

17. The method as set forth in claim 13, comprising the further step of providing a signal when it is desired to increase a concentration of product in a solution, wherein product withdrawn from the container is withdrawn and dispensed into the solution product being withdrawn from the container and dispensed into the solution in response to the signal.

* * * * *